United States Patent [19]

Bartels

[11] 4,259,982
[45] Apr. 7, 1981

[54] RESISTIVE FLUID DETECTING MEANS

[75] Inventor: James I. Bartels, Hudson, Wis.

[73] Assignee: Honeywell Inc., Minneapolis, Minn.

[21] Appl. No.: 95,721

[22] Filed: Nov. 19, 1979

[51] Int. Cl.³ .................... B01F 23/24; G01F 23/00
[52] U.S. Cl. .......................... 137/392; 73/304 R; 307/118; 340/620; 361/178
[58] Field of Search .......... 73/304 R; 137/392; 307/118; 361/178; 340/620; 417/36, 44, 45

[56] References Cited

U.S. PATENT DOCUMENTS

| | | | |
|---|---|---|---|
| 3,422,415 | 1/1969 | Ichimori | 340/620 |
| 3,498,131 | 3/1970 | Rickey | 340/620 |
| 3,534,352 | 10/1970 | Gallagher | 340/620 |
| 3,667,022 | 5/1972 | Quinn | 417/36 |
| 3,671,142 | 6/1972 | Calabrese | 417/36 |
| 3,734,123 | 5/1973 | Pomerantz | 361/178 |
| 3,922,564 | 11/1975 | Kachuk et al. | 307/118 |
| 4,019,067 | 4/1977 | Gladstone | 307/118 |
| 4,027,172 | 5/1977 | Hamelink | 307/118 |
| 4,105,367 | 8/1978 | Francis, Jr. | 417/36 |
| 4,110,740 | 8/1978 | Akita et al. | 340/620 |
| 4,112,318 | 9/1978 | Hamelink | 340/620 |

*Primary Examiner*—Martin P. Schwadron
*Assistant Examiner*—G. L. Walton
*Attorney, Agent, or Firm*—Alfred N. Feldman

[57] ABSTRACT

A resistive fluid or boiler water type of detecting system has been disclosed. A single conductor type of probe having a plurality of conducting regions that are capable of conducting a bidirectional electric current in either a full bidirectional mode or in a unidirectional mode has been disclosed. The single probe element is capable of three separate and distinct states of operation. The first state is when there is an absence of current, the second is when there is a unidirectional portion of the bidirectional current flowing, and the third state is when the full bidirectional electric current is allowed to flow. An output device is responsive to these three states to provide different types or levels of control.

12 Claims, 3 Drawing Figures

RESISTIVE FLUID DETECTING MEANS

BACKGROUND OF THE INVENTION

Resistive fluid detecting means in the form of probes to sense the presence or absence of a resistive fluid in a container have been known for many years. One widely used type of installation that relies on resistive fluid detecting means are boilers. The presence or absence of boiler water in a heating plant boiler can be monitored by a resistive fluid detecting probe. This type of probe normally relies on the establishment of a single conductive circuit between the probe and the boiler itself. A resistance measurement is then converted into a decision as to whether or not the boiler water is present in the boiler. In some systems, two probes are used to establish two different levels of water in a boiler, thereby establishing a differential between the need to add water to the boiler and the normal content of water within the boiler. The establishment of the differential is desirable in order to eliminate the need for cycling a pump or solenoid valve when a ripple or slight movement of the boiler water level occurs at the end of a probe.

Boiler water sensing mechanisms also have been developed which utilize floats to sense the level of boiler water and mechanically operate switches. This type of mechanism is subject to wear and boiler water scale contamination, thereby creating a sensing mechanism which may be more complex and less desirable than a simple resistive fluid detecting type of probe.

SUMMARY OF THE INVENTION

The present invention utilizes a single probe element or means that has a plurality of conductive regions that are electrically connected in series with each other and then connected in a series circuit with a source of bidirectional electric current. The novel probe means is capable of detecting three different resistive fluid levels. By using a single probe means that is cable of detecting three separate states or levels, it is possible to provide for a system which is capable of detecting the presence of a conductive fluid and then establishing a differential between the presence of the fluid and the maximum level to which the fluid is to be supplied within a container.

When the present invention is applied to boilers utilized in heating installations, the probe means is capable of sensing the presence of water, the presence of water in an intermediate or differential area, and the further maximum level to which the boiler water is to be maintained in the boiler. The intermediate or differential area is used so that ripples in the boiler water do not inadvertently operate the source of water to the boiler. In typical boiler installations the water is either supplied by opening a solenoid operated valve from a pressurized source of water, or is supplied by energizing a pump which supplies water to the boiler. It is quite apparent that it is undesirable to be adding small amounts of water due to a ripple or disturbance in the water at a probe, and therefore the use of a differential is desirable.

With the present invention a single series circuit is capable of supplying the necessary control signal to a fluid level control means that in turn controls either a pump or a valve to supply water to the boiler. The present invention relies on the introduction of a asymmetric current conducting function in the probe means, and the energization of the probe means by a bidirectional source of electric current. With this arrangement the probe is capable of providing three separate and distinct signals to the fluid level control means. The first signal is the total absence of any electric current when the fluid level is below the probe element. When the fluid level rises to contact the probe element, the probe conducts current in a unidirectional manner due to the presence of an asymmetric current conducting means in the probe. As the fluid rises, and contacts the upper portion of the probe, the unidirectional electric current that is flowing is changed to a bidirectional type of current. The fluid level control means detects this change and thereby senses the maximum level to which the fluid or water is to rise.

DESCRIPTION OF THE PREFERRED EMBODIMENT

Figure 1:
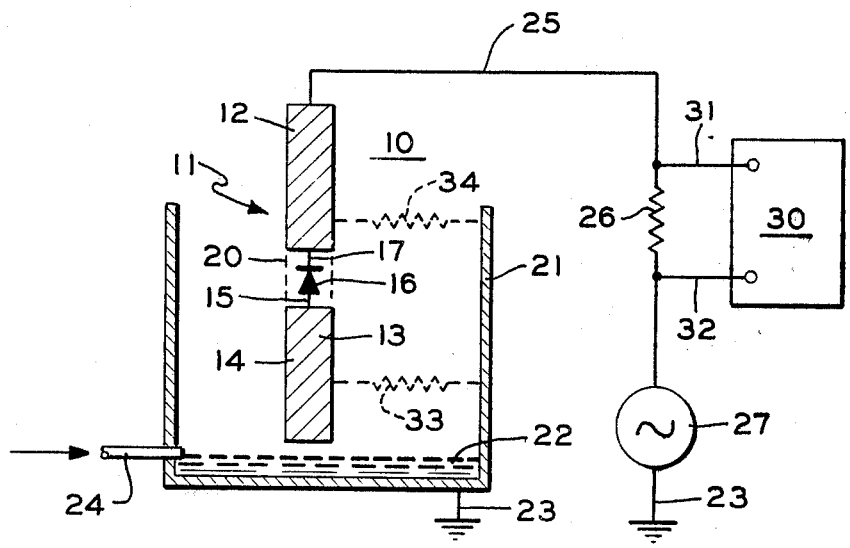
FIG. 1 is a schematic representation of a simplified probe means.

In FIG. 1 there is disclosed a schematic or simplified version of the resistive fluid detecting means generally disclosed at 10 which is part of a resistive fluid level control system that forms the overall disclosure of FIG. 1. The resistive fluid detecting means 10 includes a probe means generally disclosed at 11 that is made up of a plurality of conductive regions. In the disclosure of FIG. 1 the upper conductive region is disclosed at 12, while the lower conductive region is disclosed at 13. The upper conductive region 12 is any type of electrical impedance, such as a conductive metal rod. The lower or second conductive region 13 is made up of two elements. The first element is a conductive metal rod 14 which is connected at 15 to a diode or asymmetric current conducting means 16. The diode 16 is further connected at 17 to the first or upper conductive region or rod 12. A non-conductive support member 20 has been disclosed as mechanically holding the upper conductive region 12 and the lower conductive region 13 together along with the diode 16. The diode 16 could be encapsulated in epoxy or plastic in order to protect it and add mechanical rigidity to the probe means 11.

It is apparent that the probe means 11 comprises an upper conductive region and a lower conductive region with those two regions being electrically connected in series with the intermediate diode 16 so that the lower conductive region 13 becomes an impedance that is capable of conducting an electric current only in one direction. The reason for this will become obvious when the overall system has been disclosed.

The probe means 11 is supported (in any appropriate manner) in a container 21 that could be a boiler for a heating plant or any other type of container which contains a resistive fluid 22. The container 21 is grounded at 23. The container or boiler 21 has an inlet pipe 24 that is supplied with the resistive fluid 22 under the influence of a pump or pressurized source that is controlled by a solenoid valve as would be conventional in any boiler installation. The resistive fluid level control system is completed by a conductor 25 that is connected through a load resistor 26 to a source of bidirectional electric curent 27 which in turn is grounded at 23. The bidirectional source of electric current 27 can be considered in the disclosure of FIG. 1 as a conventional source of alternating current supply at an appropriate voltage. An amplifier means, detector, and output control device such as a relay is generally disclosed at 30 with a pair of conductors 31 and 32 connecting the amplifier means 30 across the load resistor 26. The details of an amplifier means, detector, and output relay configuration for a pump or solenoid will be disclosed in some detail in connection with FIG. 2. The amplifier means 30 that has been disclosed simply is an arrangement that is capable of responding differently to three different voltage states across the load resistor 26.

OPERATION OF FIG. 1

In the disclosure of FIG. 1 the resistive fluid 22 is disclosed as below the end of the lower conductive region 13 and it is quite apparent that in the state shown that no current flows from the source 27 through the load resistor 26 and the conductor 25 through the probe means 11. At this time there is therefore no voltage appearing across the load resistor 26 and the amplifier means 30 responds accordingly. That is, with no voltage at the input of the amplifier means 30, the output of the amplifier means 30 recognizes that the resistive fluid 22 in the container 21 is below the probe means 11 and fluid is introduced in pipe 24.

As soon as the fluid 22 reaches the bottom conductive region 14 an electric circuit is completed from the source of potential 27 through the load resistor 26 and the conductor 25 along with the probe means 11 to the ground 23. Due to the presence of the asymmetric current conductive means or diode 16 the current that flows in this series circuit is unidirectional. More specifically, half wave rectified voltage appears across the load resistor 26. The amplifier means 30 is designed to recognize the difference between the total absence of a voltage and a half wave rectified alternating current. A phantom resistance 33 has been disclosed as representative of the current path that is established when the conductive fluid 22 reaches the lower conductive region 13 and the phantom resistor 33 represents the electric circuit between the probe means 11 and the ground 23.

As the conductive fluid 22 continues to rise in the container 21 the fluid eventually reaches a level where the conductive fluid 22 comes into direct contact with the upper conductive region 12 and this resistance is shown as the phantom resistance 34. It is apparent that at this point that the diode or asymetric current conducting means 16 is shorted out of the circuit and the current that flows in the circuit through the load resistance 26 now generates a full wave alternating current voltage across the resistance 26. The amplifier means 30 responds to this full wave or bidirectional voltage which reflects that fact that a bidirectional electric current is flowing in the series circuit in which the probe means 11 is connected. The amplifier means 30 responds by turning "off" the pump or closing the valve that supplies the conductive fluid or water to the pipe 24.

It will thus be apparent that in the system disclosed in FIG. 1 that three separate and distinct operating states have been established. The first operating state is one in which no voltage appears across the load resistance 26. The next state is when a unidirectional or rectified voltage appears across the load resistance 26. The final or third state is when a bidirectional current flows in the resistance 26 thereby providing a bidirectional voltage to the amplifier means 30. With the present series circuit involving the probe means 11 and the two conductive regions 12 and 13 three different operating states are possible.

The principle of operation which was developed schematically in FIG. 1 will now be applied to a system that is more representative of the manner in which the boiler water probe element would be applied to a boiler and how an amplifier means 30 would be structured for control purposes. Also, the system operation may be reversed from that described. For example, a sump pump controller could be turned "on" at a high level of water, and "off" when the water is below the probe 11. There are other applications for this reverse mode of operation.

Figure 2:
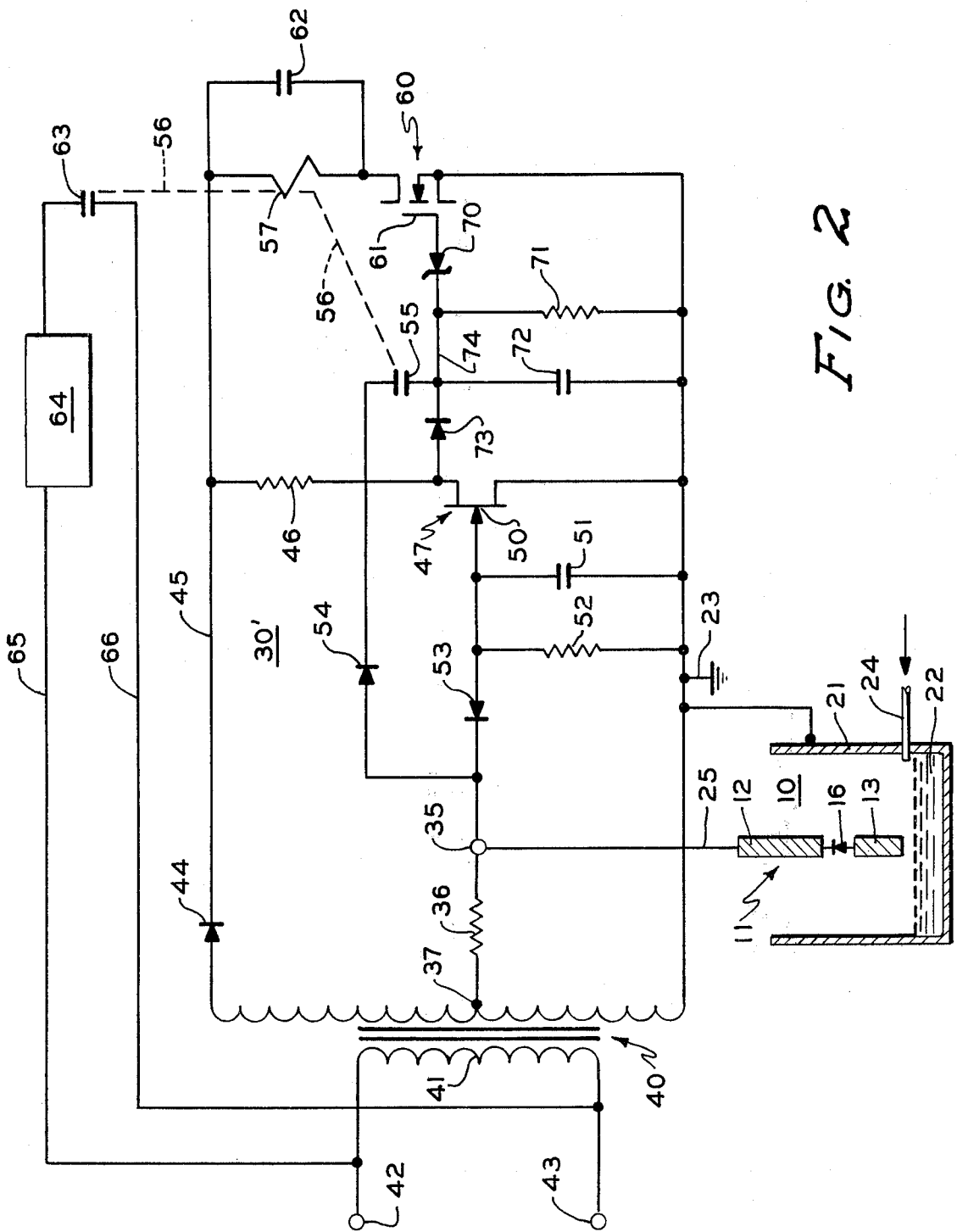
FIG. 2 is a complete resistive fluid level control system.

In FIG. 2 the resistive fluid detecting means 10 is again disclosed with the elements carrying the same reference numbers as disclosed in FIG. 1. The boiler 21 is connected to the ground 23 that forms the ground of an amplifier 30'. The probe means 11 is connected by the conductor 25 to a terminal 35 within the amplifier means 30'. The terminal 35 is connected through a sensitivity setting resistor 36 that is connected to a tap 37 of a transformer winding 38. Transformer winding 38 is the secondary step down side of a transformer generally disclosed at 40 which has a primary winding 41 connected to a pair of line terminals 42 and 43 which are connected to a conventional source of bidirectional or alternating current. The winding 38 is further connected through a diode 44 so that a rectified control potential is supplied on conductor 45 for the amplifier means 30'.

Connected between the conductor 45 and the ground 23 is a resistor 46 and a field effect transistor generally disclosed at 47. The field effect transistor 47 is of a type which requires a negative potential on a gate 50 for the field effect transistor 47 to cease conduction. The gate 50 is connected to a capacitor 51 and a resistor 52 that are both in turn connected to the ground 23. The gate 50 is further connected through a diode 53 to the terminal 35. The terminal 35 is further connected through a reverse connected diode 54 to a normally open relay contact 55 that is mechanically operated by an armature 56 from a relay coil 57. The relay coil 57 is connected at one of its extremities to the conductor 45 and at its opposite extremity through a further field effect transistor generally disclosed at 60. The field effect transistor 60 has a gate 61, but since the field effect transistor 60 is an insulated gate type of field effect transistor, the gate 61 requires a positive driving potential to cause the transistor 60 to conduct.

The field effect transistor 60 is further connected to the ground 23 to complete a current path through the relay coil 57. The relay coil 57 is paralleled by a capacitor 62 that acts to stabilize the relay's operation. The relay armature 56 is connected to further normally open contacts 63 that acts as an output control to control a pump or solenoid valve 64 that is in turn connected by a pair of conductors 65 and 66 to the line potential terminals 42 and 43. The closing of the contacts 63 energize the pump or solenoid valve 64 to supply fluid to the pipe 24 in the operation of the system.

The circuit of the amplifier means 30' is completed by connecting the gate 61 of the field effect transistor 60 through a zener diode 70 to parallel combination of a resistor 71 and a capacitor 72 to the ground 23. The capacitor 72 and the resistor 71 form a time delay circuit in conjunction with a further diode 73 that is connected between the resistor 46 and the common conductor 74 that joins the zener diode 70 to the capacitor 72, the resistor 71, and the normally open relay contact 55.

OPERATION OF FIG. 2

It is initially assumed that the amplifier means 30' has been just energized by the application of a bidirectional alternating current in the form of a conventional 60 hertz voltage to the terminals 42 and 43. At this particular time the resistive fluid or water 22 is below the end of the conductive region 13. At this time also the relay coil 57 is deenergized and the relay contacts 63 and 55 are open, as shown in FIG. 2.

As soon as the voltage is applied to the terminals 42 and 43, voltage appears across the lower portion of the secondary winding 38 and current flows through the diode 53, the resistor 36, and the lower portion of the winding 38 to the ground 23. This current is then drawn through a relatively high resistance 52 and simultaneously through the capacitor 51 to charge the capacitor 51 with a potential that is negative at the gate 50 of the field effect transistor 47. At the outset or energization of the terminals 42 and 43, the field effect transistor 47 has had an insufficient negative potential at the gate 50 to cause it to be in an "off" state, and therefore bidirectional current has been flowing through the field effect transistor 47. This drops substantially all of the voltage across the resistor 46 and there is effectively a ground potential on the diode 73 where it joins the field effect transistor 47. This effectively shorts out the gate 61 of the insulated gate field effect transistor 60 and therefore the field effect transistor 60 is in an "off" state.

The capacitor 51 rapidly charges and provides a negative potential at the gate 50 of the field effect transistor 47 thereby turning the field effect transistor "off". As soon as the field effect transistor 47 ceases to conduct, the voltage that appears on conductor 45 is applied through the resistor 46 and the diode 73 to charge the capacitor 72. As soon as the capacitor 72 takes on a sufficient charge to break down the zener diode 70, a positive potential appears at the gate 61 of the field effect transistor 60 thereby turning the field effect transistor 60 "on". The relay coil 57 then draws sufficient current through the field effect transistor 60 to cause the armature 56 to close the contacts 63 and 55. The closing of the contacts 63 immediately causes the pump or valve 64 to supply water or a resistive fluid to the pipe 24. The closing of the contact 55 through the diode 54 effectively locks the system into this state by supplying a direct source of potential through the diode 54 to the capacitor 72 to continue to supply the positive potential on the gate 61 of the field effect transistor 60 necessary to keep it in conduction.

The resistive fluid 22 rises in the container or boiler 21 until it reaches the conductive region 13 where a current path is completed through the diode element 16. This action effectively takes the diode 53 and its related components out of control of the field effect transistor 47. Since the relay contact 55 has closed, however, the field effect transistor 60 is not altered in its state of conduction and the relay coil 57 is still energized to hold the contacts 63 closed.

As the resistive fluid or water 22 rises it eventually reaches the level where it comes in contact with the conductive region 12. As soon as the water or resistive fluid 22 reaches the conductive region 12, the resistive fluid 22 acts as a short to the terminal 35 effectively removing the gating potential from the field effect transistor 60. With the gating potential removed, a slight time delay is generated by the discharge of the capacitor 72 through the resistor 71 to hold the gate 61 sufficiently positive for a few moments to keep the relay energized to prevent ripples in the resistive fluid or water 22 from causing the pump to accidentally turn "on" again.

The time delay created by the discharge of the capacitor 72 through the resistor 71 passes and the gate 61 of the field effect transistor 60 is such that the necessary positive gating potential no longer exists. Under this condition the field effect transistor 60 becomes non-conductive and the relay coil 57 is deenergized thereby dropping out the contacts 55 and 63. This turns "off" the pump or valve 64 and opens the holding circuit created through the contact 55. A slight drop in the water or resistive fluid 22 does not create a cycling action on the pump or valve 64 as a differential is created by the upper conductive region of the probe means 11. When the liquid level 22 drops to a sufficient point to open the circuit entirely, the operation of the system starts over again. The differential can be established by the design of the probe and/or the parameters of the particular amplifier circuit used.

Figure 3:
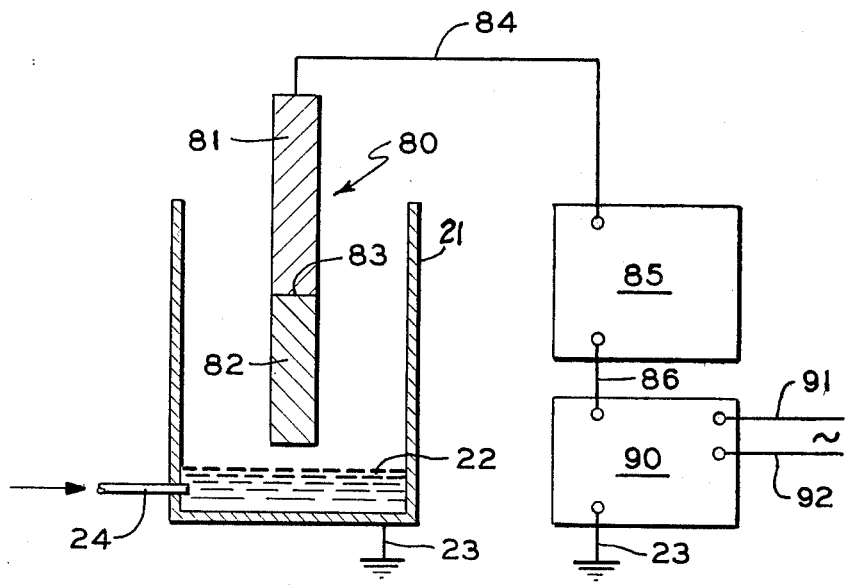
FIG. 3 is a simplified version of a second embodiment of the present invention.

In FIG. 3 a further version of the probe means has been disclosed. The boiler or container 21 is again disclosed having a resistive fluid 22 and a ground 23 along with an inlet pipe 24. A probe means 80 is suspended in an appropriate position within the container or boiler 21. The probe means 80 has an upper region 81 that is an impedance capable of carrying a bidirectional electric current. A second conductive region 82 is disclosed which is mechanically and electrically joined at 83 to the conductive region 81. In this embodiment, the conductive region 82 is composed of a material that is capable of conducting only a unidirectional portion of the bidirectional electric current that is to be applied to the conductive region 82. A material which provides this function is titanium. The reason that the titanium is a material which is capable of conducting only a unidirectional portion of the bidirectional current when it is applied to the present structure will be described after the balance of the system has been described.

The conductive region 81 is connected by a conductor 84 to an amplifier and output control means 85 that in turn is connected by a conductor 86 to a source of bidirectional electric current 90. The source of bidirectional electric current 90 is energized from a pair of conventional alternating current lines 91 and 92, and the bidirectional source of electric current 90 is grounded at 23 to complete its ability to apply a bidirectional electric current through the container 21 and the resistive fluid 22 to the probe 80 when the resistive fluid 22 rises to a sufficient level.

In FIG. 3 the source of bidirectional electric current 90 is a source of very low frequency bidirectional electric current. The source 90 could be any type of oscillator generating a low frequency alternating current wave form or any other type of switched bidirectional current such as a positive and/or negative wave form of a generally rectangular form. The specific electronics of the bidirectional electric current source 90 is not material to the present invention, and it is well known in the art to convert a conventional 60 hertz alternating current to any other convenient frequency that is desired.

In order to have the embodiment of FIG. 3 functional, it is necessary that the probe means 80, and particularly the conductive region 82 be capable of carrying only a unidirectional portion of the bidirectional current that is applied when the resistive fluid 22 rises to be in contact with the conductive region 82. It should be understood that a conductive region 82 made of titanium would have this characteristic. When the titanium conductive region 82 is at a positive potential and in contact with water in a boiler water application, the surface of the titanium changes to titanium dioxide and becomes an insulator. This means that whenever a positive potential is applied between the conductor 84 and ground, that the titanium generates a titanium oxide layer that makes the conductive region 82 non-conductive for that portion of the applied bidirectional electric current. When the titanium conductive region 82 is subjected to a negative potential on the conductor 84 with respect to the ground 23, the titanium oxide which is present on its surface dissolves in the water and the titanium surface becomes a normal conductor. As such, the system acts as if the system is operating in a half wave fashion. The only requirement of the present system is that the frequency of the bidirectional electric current that is applied must be low enough so that the formation and removal of the titanium dioxide layer can be accomplished.

With this understanding it will be noted that as the present system of FIG. 3 has a fluid level so that the resistive fluid 22 is not in contact with the probe means, it is obvious that no current flows in the amplifier means 85 and this causes the amplifier means 85 to energize a pump or source of resistive fluid to add fluid so that the resistive fluid rises until it becomes in contact with the region 82. At this time, the low frequency bidirectional electric current is applied between the conductive region 82 and the resistive fluid 22. Due to the action previously mentioned, the conductive region is capable of conducting only a unidirectional portion of the bidirectional electric current. The unidirectional current flow through the amplifier means 85 is sensed and the proper control function is provided. As the fluid 22 rises until it comes in contact with the conductive region 81, the full bidirectional electric current flows in conductor 84 and the amplifier 85 turns "off" the pump or source of fluid to the container 21. It will thus be noted that the probe means 80 functions in this sytem in a manner that is similar to the probe means 11 of FIGS. 1 and 2.

The manner in which the probe means 11 or 80 is fabricated is subject to great variation within the knowledge of anyone skilled in this art. The particular electronics utilized to implement the operation of a system utilizing the probe means also can be widely varied within the skill of those working in the electronics art. For these reasons, the applicant wishes to be limited in the scope of the design and application of the present invention solely by the scope of the appended claims.

The embodiments of the invention in which an exclusive property right is claimed are defined as follows:

1. A resistive fluid detecting means adapted to sense a resistive fluid level in a container, including: unitary probe means having a diode action and further having a plurality of conductive regions all of which are in said container and are submersible in said resistive fluid with said probe means being adapted to be connected to a source of bidirectional electric current; a first of said regions being an impedance capable of conducting said bidirectional electric current; a second of said regions being an impedance capable of conducting only a unidirectional portion of said bidirectional electric current; and said first and said second regions being connected in electrical series and further connected in a series electrical circuit with said source of bidirectional electric current; said resistive fluid detecting means responding separately to the absence of said current, the presence of said unidirectional portion of said bidirectional current, and to the presence of said bidirectional current as an indication of a level of said fluid in said container.

2. A resistive fluid detecting means as described in claim 1 wherein said first conductive region includes a conductive rod; and said second conductive region includes a conductive rod and asymmetric current conducting means; said first and said second conductive regions being joined in electrical series to form a part of said series electrical circuit.

3. A resistive fluid detecting means as described in claim 2 wherein said rods are metal rods.

4. A resistive fluid detecting means as described in claim 3 wherein said asymmetric current conducting means is a diode.

5. A resistive fluid detecting means as described in claim 1 wherein said first conductive region includes a conductive rod; and said second conductive region is composed of a material that is capable of conducting only a unidirectional portion of said bidirectional electric current when said second conductive region is in contact with said resistive fluid in said container.

6. A resistive fluid detecting means as described in claim 5 wherein said conductive rod is a metal rod; and said second conductive region is a titanium rod with said rods being mechanically joined and in electrical series.

7. A resistive fluid level control system having a resistive fluid detecting means adapted to sense a resistive fluid level in a container and to in turn control said fluid level, including: a unitary probe means having a diode action and further having a plurality of conductive regions all of which are in said container and are submersible in said resistive fluid with said probe means being adapted to be connected to a source of bidirectional electric current; a first of said regions being an impedance capable of conducting said bidirectional electric current; a second of said regions being an impedance capable of conducting only a unidirectional portion of said bidirectional electric current; said first and said second regions being connected in electrical series and further connected in a series electrical circuit with said source of bidirectional electric current; and fluid level control means responsive to the absence of said current, the presence of said unidirectional portion of said bidirectional current, and the presence of said bidirectional current to control the level of said conductive fluid in said container.

8. A resistive fluid level control system as described in claim 7 wherein said first conductive region includes a conductive rod; and said second conductive region includes a conductive rod and asymmetric current conducting means; said first and said second conductive regions being joined in electrical series to form a part of said series electrical circuit.

9. A resistive fluid level control system as described in claim 8 wherein said rods are metal rods.

10. A resistive fluid level control system as described in claim 9 wherein said asymmetric current conducting means is a diode.

11. A resistive fluid level control system as described in claim 7 wherein said first conductive region includes a conductive rod; and said second conductive region is composed of a material that is capable of conducting only a unidirectional portion of said bidirectional electric current when said second conductive region is in contact with said resistive fluid in said container.

12. A resistive fluid level control system as described in claim 11 wherein said conductive rod is a metal rod; and said second conductive region is a titanium rod with said rods being mechanically joined and in electrical series.

* * * * *